United States Patent
Gomi et al.

(10) Patent No.: US 9,430,987 B2
(45) Date of Patent: Aug. 30, 2016

(54) IMAGE DISPLAY DEVICE

(71) Applicant: Seiko Epson Corporation, Tokyo (JP)

(72) Inventors: Tsugio Gomi, Fujimi (JP); Kazunori Sakurai, Chino (JP)

(73) Assignee: Seiko Epson Corporation (JP)

( * ) Notice: Subject to any disclaimer, the term of this patent is extended or adjusted under 35 U.S.C. 154(b) by 138 days.

(21) Appl. No.: 14/149,176

(22) Filed: Jan. 7, 2014

(65) Prior Publication Data

US 2014/0192077 A1 Jul. 10, 2014

(30) Foreign Application Priority Data

Jan. 7, 2013 (JP) ................. 2013-000357

(51) Int. Cl.
*G09G 5/02* (2006.01)
*G06F 1/16* (2006.01)

(52) U.S. Cl.
CPC ............... *G09G 5/02* (2013.01); *G06F 1/1601* (2013.01); *G09G 2320/0693* (2013.01); *G09G 2360/144* (2013.01); *G09G 2360/145* (2013.01)

(58) Field of Classification Search
CPC ........... G09G 5/02; G09G 2320/0693; G09G 2360/144; G09G 2360/145; G09G 2360/14–2360/148; G06F 1/16; G06F 1/1601; C12Q 1/6837; C12Q 2522/101; C12Q 2523/125; C12N 15/1034; C12N 15/1093; G01N 33/5308; Y10S 436/809
USPC .......... 345/87–102, 204–214, 690–699, 589; 530/350, 300; 422/50; 435/270, 284.1, 435/287.9, 4, 6.12, 7.1; 346/501, 518, 525, 346/529, 535, 809; 506/17, 26, 9
See application file for complete search history.

(56) References Cited

U.S. PATENT DOCUMENTS

| | | | |
|---|---|---|---|
| 6,590,648 B1 | 7/2003 | von Orelli et al. | |
| 2004/0017379 A1* | 1/2004 | Ajito et al. | 345/600 |
| 2007/0216622 A1* | 9/2007 | Kim et al. | 345/88 |
| 2010/0027096 A1* | 2/2010 | Pan | 359/260 |
| 2011/0176128 A1 | 7/2011 | Matsuno | |
| 2011/0261357 A1* | 10/2011 | Horiguchi | 356/328 |
| 2012/0133948 A1* | 5/2012 | Funamoto | 356/451 |
| 2012/0268437 A1* | 10/2012 | Lee | 345/207 |
| 2013/0037700 A1* | 2/2013 | Michiyama et al. | 250/208.2 |
| 2013/0100320 A1* | 4/2013 | Yamada et al. | 348/247 |
| 2013/0229646 A1* | 9/2013 | Sakurai | 356/51 |
| 2014/0226158 A1* | 8/2014 | Trainer | 356/336 |

FOREIGN PATENT DOCUMENTS

| | | |
|---|---|---|
| JP | 2001-056251 A | 2/2001 |
| JP | 2005-208548 A | 8/2005 |
| JP | 2011-150108 A | 8/2011 |

* cited by examiner

*Primary Examiner* — Dmitriy Bolotin
(74) *Attorney, Agent, or Firm* — Harness, Dickey & Pierce, P.L.C.

(57) ABSTRACT

An image display device includes a display section adapted to display an image, a photometric section including a variable wavelength interference filter adapted to transmit light with a predetermined wavelength from incident light and a photosensor adapted to detect light obtained by dispersion, and disposed so as to be opposed to the display section, and a control section adapted to control the display section and the photometric section, and the control section obtains a spectrum of the incident light based on light intensity of the light detected by the photosensor, and then performs a color correction of the display section based on the spectrum.

8 Claims, 8 Drawing Sheets

IMAGE DISPLAY DEVICE

BACKGROUND

1. Technical Field

The present invention relates to an image display device.

2. Related Art

In the past, there has been known a display device, which measures a feature quantity such as the luminance of an image displayed to adjust display colors (see, e.g., JP-A-2005-208548 (Document 1)).

The display device described in Document 1 is provided with a photometric device retractably projecting from a bezel to a display area. The photometric device is provided with a photosensor and a photodetector opposed to a display screen, and the display device corrects the display colors based on a measurement result of the photometric device.

Incidentally, in order to appropriately correct the colors of the image displayed on the display device, it is necessary to accurately measure the colors of the image displayed. In the case of, for example, using a liquid crystal display device as the display device, a cold-cathode tube is used as the backlight, and the spectrum of the light emitted from the liquid display device has a peaked spectrum shape (a sharp shape with a small half-value width in each peak wavelength) as shown in FIG. 9. Even in the case of using a light emitting element such as an LED or an organic EL as the backlight, the spectrum shape in the peak wavelength also becomes peaked in a similar manner.

In Document 1 mentioned above, the feature quantity of the light is measured by the photosensor or the photodiode with respect to such a display device. Such a photosensor or a photodiode can only measure the limited color information such as RGB components, and is not capable of measuring such a detailed spectrum as described above. Therefore, in the display device using such a measurement device as described above, there is a problem that an appropriate color correction of the display image is not achievable.

SUMMARY

An advantage of some aspects of the invention is to provide an image display device capable of performing an appropriate color correction of the display colors.

An image display device according to an aspect of the invention includes a display section adapted to display an image, a photometric section having a spectroscopic element adapted to disperse incident light, and a detection section adapted to detect light obtained by the dispersion, and disposed so as to be opposed to the display section, and a control section adapted to control the display section and the photometric section, and the control section obtains a spectrum of the incident light based on light intensity of the light obtained by the dispersion detected by the detection section, and then performs a color correction of the display section based on the spectrum.

In this aspect of the invention, the light output from the display section is dispersed by the spectroscopic element, and the light obtained by the dispersion is detected by the detection section. Further, the control section obtains the spectrum of the light output from the display section based on the detection result of the light obtained by the dispersion, and then performs the color correction in the display section based on the spectrum.

According to such a configuration as described above, since the light intensity in each of the wavelengths can accurately be obtained by detecting the light via the spectroscopic element, the accurate spectrum of the light output from the display section can be obtained. Therefore, the color correction of the display section can appropriately be performed based on the accurate spectrum.

In the image display device according to the aspect of the invention described above, it is preferable that the spectroscopic element is a variable wavelength etalon, which includes a first reflecting film adapted to reflect a part of the incident light and transmit a part of the incident light, and a second reflecting film disposed so as to be opposed to the first reflecting film, and adapted to reflect a part of the incident light and transmit a part of the incident light, and makes the light entering a space between the first reflecting film and the second reflecting film interfere with each other to take out light with a specific wavelength.

According to this configuration, the spectroscopic element is formed of the variable wavelength etalon (a variable wavelength Fabry-Perot etalon) for making the incident light entering the space between the first reflecting film and the second reflecting film interfere with each other to thereby transmit the light with a specific wavelength. Such a Fabry-Perot etalon can be miniaturized compared to the spectroscopic element such as an acousto-optic tunable filter (AOTF) or liquid crystal tunable filters (LCTF), and can easily be incorporated into the image display device.

In the image display device according to the aspect of the invention described above, it is preferable that the spectroscopic element includes a first substrate provided with the first reflecting film, a second substrate opposed to the first substrate and provided with the second reflecting film, and a gap changing section adapted to change a gap dimension between the first reflecting film and the second reflecting film.

Although it is also possible to use a variable wavelength etalon, which is formed by, for example, forming a first reflecting film on one surface of a sacrifice layer having a plate-like shape, forming a second reflecting film on the other surface, and then removing the sacrifice layer by etching or the like, as such a variable wavelength etalon as described above, a deflection might be caused in the first reflecting film and the second reflecting film in some cases. In contrast, according to the configuration described above, due to the configuration of disposing the first reflecting film on the first substrate, and disposing the second reflecting film on the second reflecting substrate, the deflection and the tilt of the reflecting films can be suppressed.

In the image display device according to the aspect of the invention described above, it is preferable that the photometric section includes an incident angle limiting unit adapted to limit an angle of the incident light entering the spectroscopic element.

In the case of making the display section display the image, the color shade of the display image viewed from a direction (or a direction roughly) perpendicular to the display section and the color shade of the display image viewed from a direction oblique to (e.g., at an angle of about 30 degrees with) the display section are different from each other.

In this configuration, by limiting the incident angle using the incident angle limiting unit, the light output from the area of the display section perpendicular or roughly perpendicular to the spectroscopic element is guided to the spectroscopic element, and the light output from the other area fails to enter the spectroscopic element. By performing the color correction based on the light having entered at such an incident angle as described above, it is possible to appropriately correct the display colors when viewing the display section from the front, namely the colors of the image displayed at an angle at which the user usually observes the display section.

Further, in the case of using the variable wavelength Fabry-Perot etalon described above as the spectroscopic element, it is necessary to input the incident light in a direction perpendicular to the first reflecting film and the second reflecting film. To cope with the above, by disposing the incident angle limiting unit as in the configuration described above, the noise light can be suppressed, and the light with the desired wavelength can accurately be transmitted.

In the image display device according to the aspect of the invention described above, it is preferable that the incident angle limiting unit is at least one light blocking plate, which is disposed between the display section and the spectroscopic element, and has a light passage hole disposed at a position overlapping the spectroscopic element in a plan view viewed from a direction perpendicular to a display surface of the display section.

According to this configuration, by disposing the light blocking plate having the light passage hole in the anterior state of the spectroscopic element, it is possible to limit the incident angle of the incident light with a simple configuration.

In the image display device according to the aspect of the invention described above, it is preferable that the incident angle limiting unit is a plurality of the light blocking plates.

According to this configuration, since a plurality of such light blocking plates as described above is disposed, the light having passed the light passage hole of each of the light blocking plates enters the spectroscopic element. Thus, the entrance of the noise light at an angle outside the preset incident angle can more surely be inhibited.

In the image display device according to the aspect of the invention described above, it is preferable that the incident angle limiting unit includes an incident angle limiting film disposed between the spectroscopic element and the display section.

In this configuration, the incident angle limiting film limits the incident angle of the incident light to the spectroscopic element. The incident angle limiting film is a film capable of highly limiting the transmitting direction of the light, and an LCF (Light Control Film, the registered trademark of 3M United States) and so on can be cited as an example. It is sufficient for such an incident angle limiting film only to adhere to the plane of incidence of light of, for example, the spectroscopic element, and the simplification of the configuration can be achieved, and the miniaturization of the photometric section can be achieved.

In the image display device according to the aspect of the invention described above, it is preferable that the display section includes a display area adapted to display the image, and a bezel section surrounding the display area, and the photometric section is disposed so as to be able to retractably proceed from the bezel section to the display area.

In this configuration, the photometric section is disposed so as to be able to retractably proceed from the bezel section to the display area. Therefore, in the case of performing the normal image display on the display section, the photometric section can be housed in the bezel section, and thus, the problem that the photometric section becomes an obstacle of display can be prevented.

BRIEF DESCRIPTION OF THE DRAWINGS

The invention will be described with reference to the accompanying drawings, wherein like numbers reference like elements.

DESCRIPTION OF EXEMPLARY EMBODIMENTS

An image display device according to an embodiment of the invention will hereinafter be explained with reference to the accompanying drawings.

Overall Configuration of Image Display Device

Figure 1:
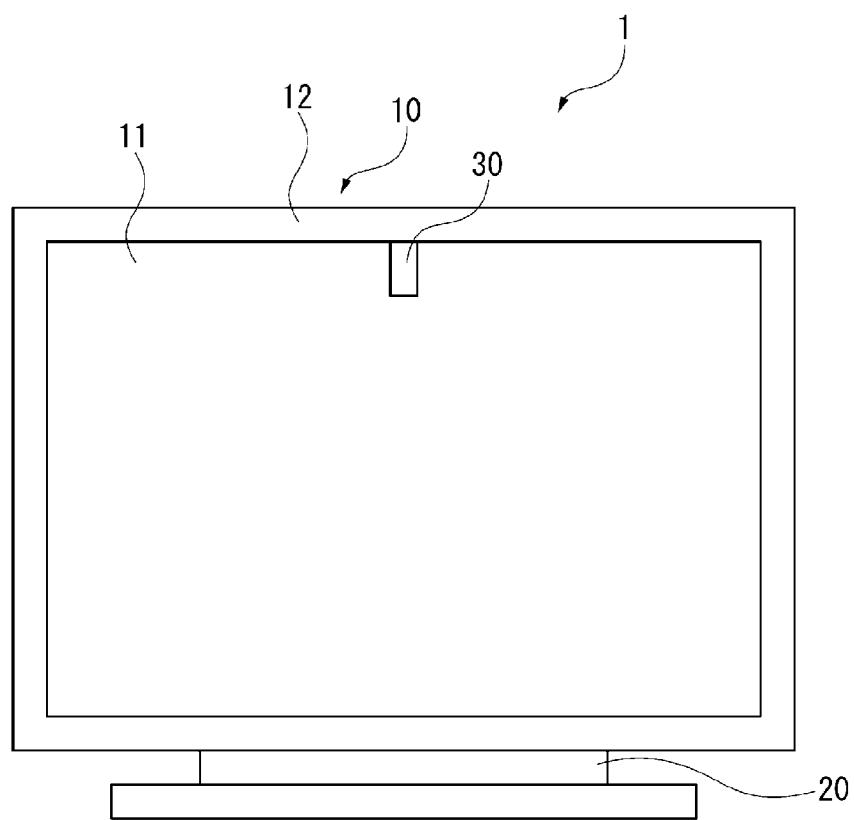
FIG. 1 is a front view showing an overview of an image display device according to an embodiment of the invention.
Figure 2:
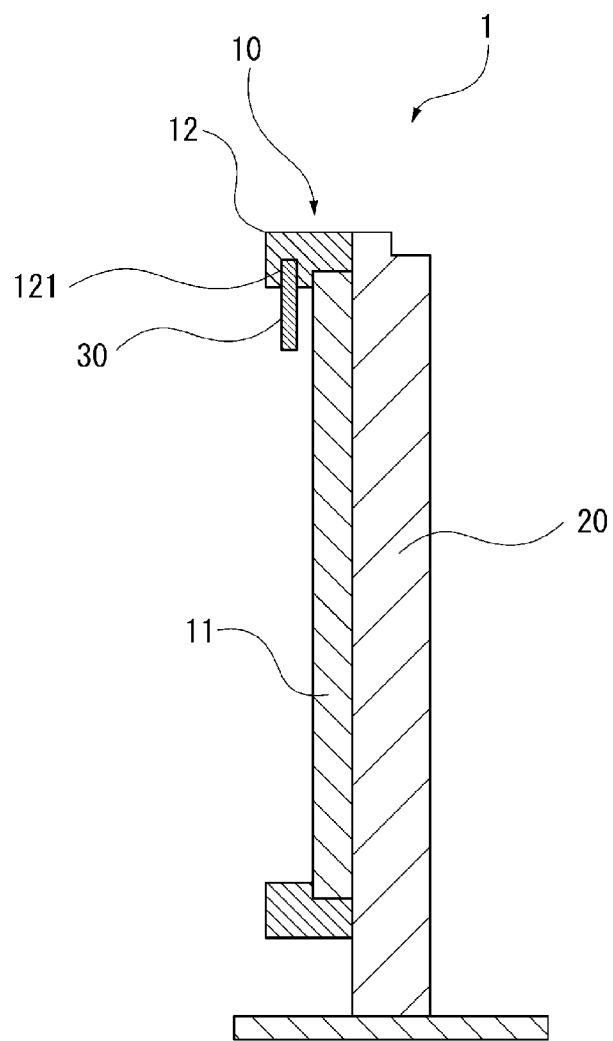
FIG. 2 is a side cross-sectional view of the image display device according to the present embodiment.

FIG. 1 is a front view showing an overview of the image display device according to the present embodiment. FIG. 2 is a cross-sectional view of the image display device according to the present embodiment.

In FIG. 1, the image display device 1 according to the present embodiment is provided with a display section 10 for displaying an image, and an exterior section 20 for holding the display section 10.

As shown in FIGS. 1 and 2, the display section 10 is provided with a display 11 as a display area, and a bezel section 12 for holding the display 11.

The display 11 can be formed of any display panel such as a liquid crystal panel, a plasma display panel (PDP), or an organic EL.

The bezel section 12 is a frame member for holding the outer peripheral portion of the display 11. As shown in FIG. 2, the bezel section 12 is provided with a photometric section 30.

Further, a control section 40 (see FIG. 6) for controlling the display 11 and the photometric section 30 is disposed in the exterior section 20, and controls an overall operation of the image display device 1. It should be noted that the detailed configuration of the control section 40 will be described later.

Configuration of Photometric Section

Then, a photometric section 30 provided to the bezel section 12 will be explained with reference to the drawings.

Figure 3:
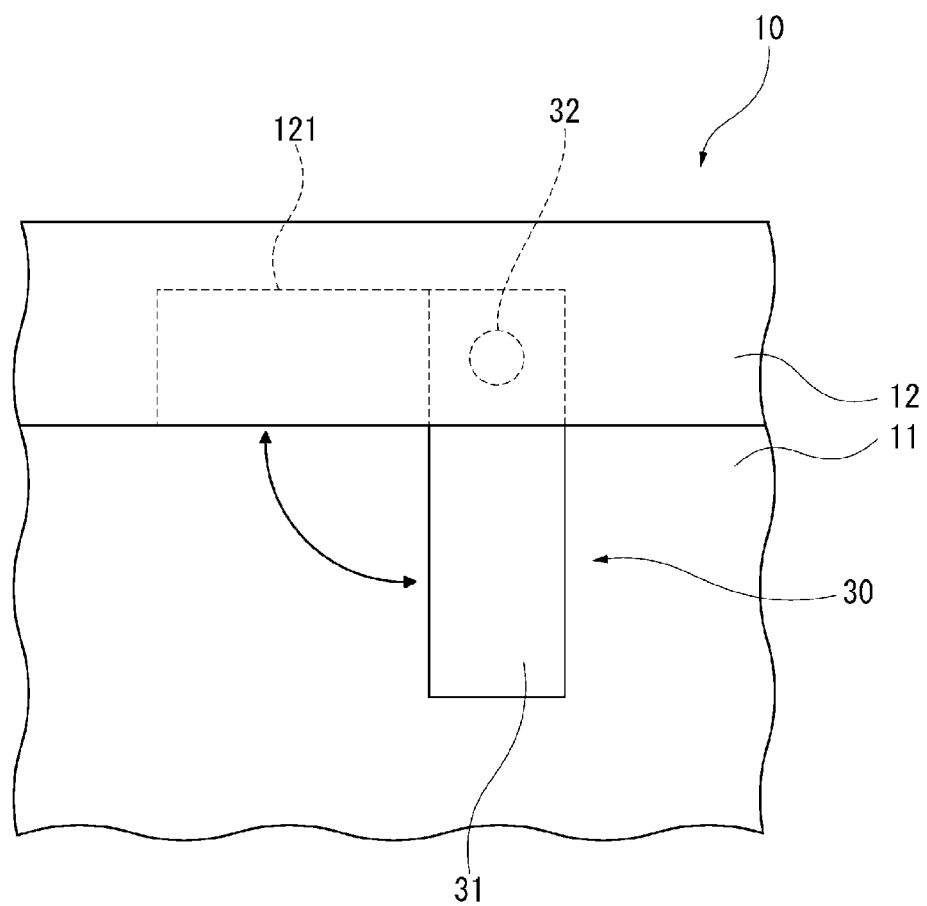
FIG. 3 is a front view showing a schematic configuration of a photometric section of the present embodiment.
Figure 4:
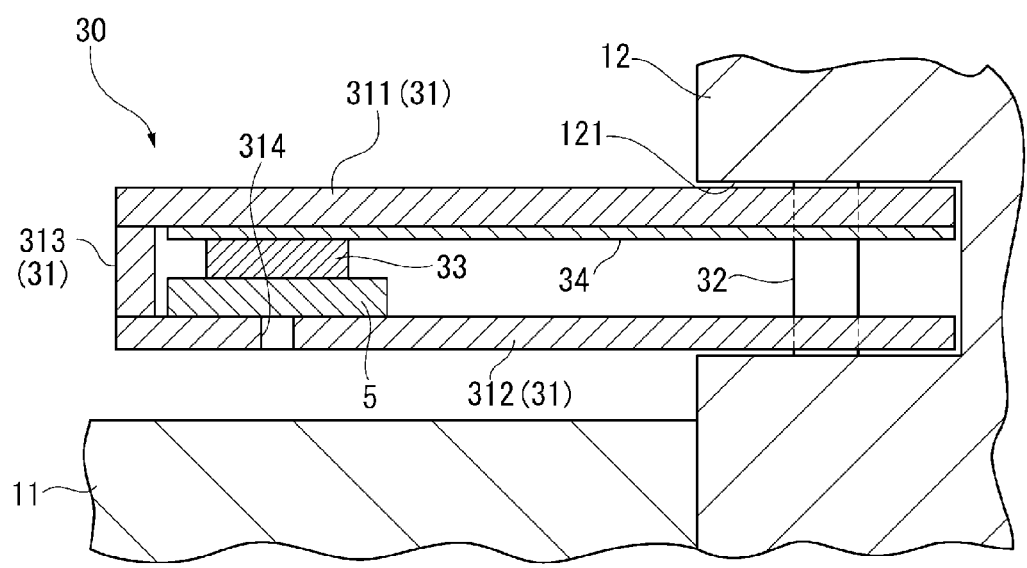
FIG. 4 is a cross-sectional view of the photometric section of the present embodiment.

FIG. 3 is a front view showing a vicinity of a part of the bezel 12 where the photometric section 30 is disposed in an enlarged manner. FIG. 4 is a diagram showing a cross-section of the photometric section 30.

The photometric section 30 is attached to the bezel section 12 surrounding the display 11. It should be noted that although the position corresponding to the center position of an upper side of the display 11 is displayed as an example of the position where the photometric section 30 is disposed in FIGS. 1 and 2, the invention is not limited to this configuration, but the position can also be, for example, a corner section of the display 11, or a configuration of disposing the photometric section 30 on a lower side, a right side, or a left side of the display 11 can also be adopted.

As shown in FIGS. 2 through 4, the bezel 12 is provided with a housing section 121 capable of housing the photometric section 30, and the photometric section 30 is retractably disposed in the housing section 121.

Specifically, as shown in FIG. 4, the photometric section 30 is provided with a case 31 retractable in the housing section 121, and the case 31 is attached to the housing section 121 of the bezel section 12 with a rotary shaft 32. Thus, by rotating the case 31 around the rotary shaft 32, it becomes possible for the photometric section 30 to freely proceed to the area opposed to the display 11 from the housing section 121 of the bezel 12, and freely retracted from the area to the housing section 121.

As shown in FIG. 4, the case 31 is provided with a front panel 311, a back panel 312, and a side panel 313, wherein these panels 311, 312, and 313 are each formed of a light blocking member. Further, the variable wavelength interference filter 5, a photosensor 33 constituting a detection section according to the invention, and a circuit board 34 are disposed inside the case 31.

The front panel 311 is a panel disposed on an opposite side of the case 31 to the display 11.

The back panel 312 is a panel opposed to the display 11 when rotating the rotary shaft 32 to make the case 31 proceed toward the display 11. Further, a part of the back panel 312 is provided with a light passage hole 314 for allowing the light output from the display 11 to enter the inside of the case 31. In other words, the back panel 312 constitutes a light blocking plate, which is included in an incident angle limiting unit according to the invention.

The side panel 313 is a panel for connecting outer peripheral edges of the front panel 311 and the back panel 312 to each other. It should be noted that the side panel 313 can also be configured integrally with the front panel 311 or the back panel 312.

Such a case 31 as described above is capable of inhibiting the problem that the light other than the light from the light passage hole 314 enters the inside of the case 31. Further, the back panel 312 is provided with the variable wavelength interference filter 5 disposed so as to be opposed to the light passage hole 314. Thus, it is possible to transmit only the incident light from the light passage hole 314 to the variable wavelength interference filter 5, and it becomes possible to inhibit an influence of the outside light. It should be noted that the specific configuration of the variable wavelength interference filter 5 will be described later.

The front panel 311 is provided with the circuit board 34, and the photosensor 33 is disposed on the circuit board 34. Further, the circuit board 34 is provided with a filter drive circuit for driving the variable wavelength interference filter 5, a sensor drive circuit for driving the photosensor 33, and so on. Further, the circuit board 34 is connected to the control section 40 of the image display device 1, and outputs a detection result (a detection signal based on the light intensity of the light detected) of the photosensor 33.

Configuration of Variable Wavelength Interference Filter

Figure 5:
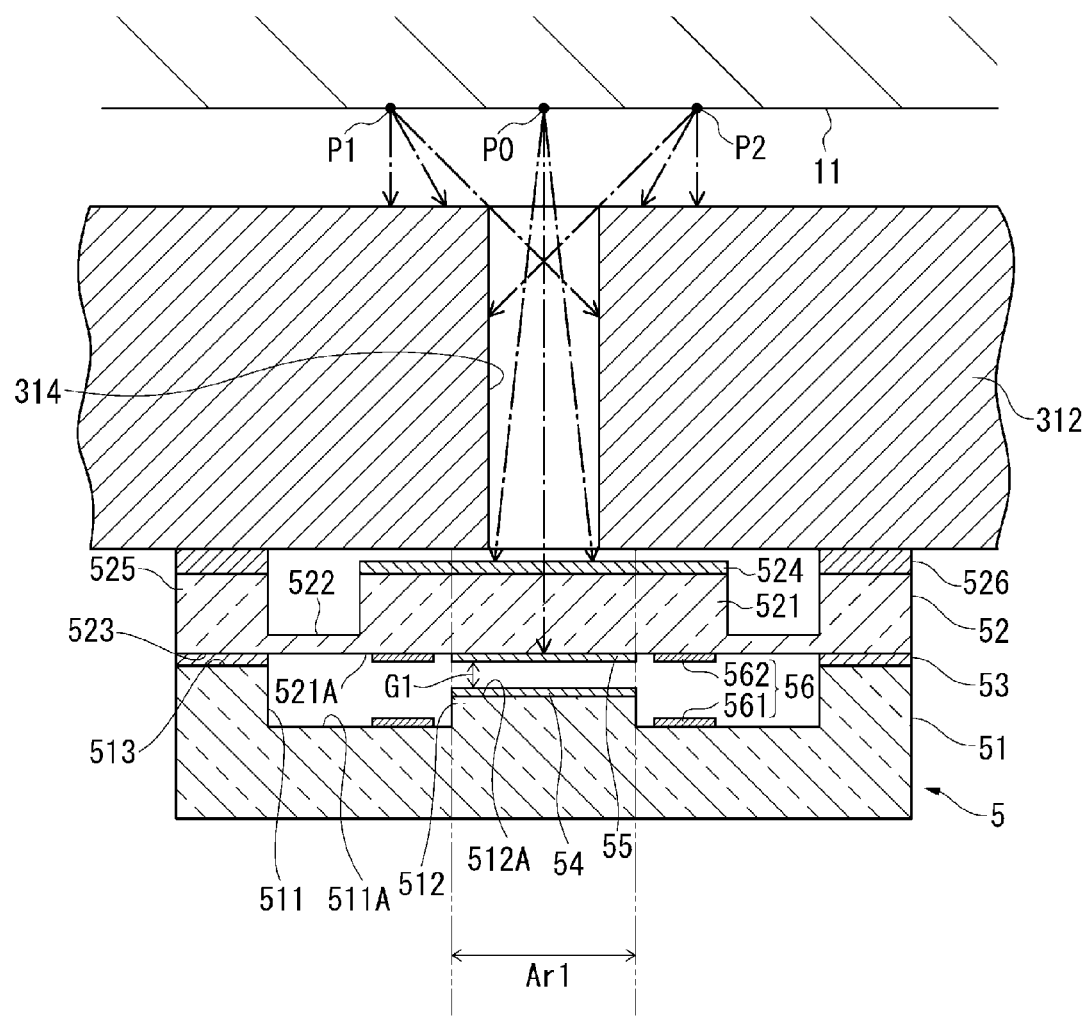
FIG. 5 is a cross-sectional view showing an outline of a variable wavelength interference filter according to the present embodiment.

FIG. 5 is a cross-sectional view showing a schematic configuration of the variable wavelength interference filter 5.

The variable wavelength interference filter 5 of the present embodiment is a variable wavelength Fabry-Perot etalon constituting the spectroscopic element according to the invention. As shown in FIG. 5, the variable wavelength interference filter 5 is provided with a stationary substrate 51 as a first substrate according to the invention, and a movable substrate 52 as a second substrate according to the invention. The stationary substrate 51 and the movable substrate 52 are each formed of, for example, a variety of types of glass, quartz crystal, or silicon. Further, the stationary substrate 51 and the movable substrate 52 are configured integrally by bonding a first bonding section 513 of the stationary substrate 51 and a second bonding section 523 of the movable substrate 52 to each other with a bonding film 53 formed of, for example, a plasma polymerized film consisting primarily of, for example, siloxane.

The stationary substrate 51 is provided with a stationary reflecting film. 54 which is a first reflecting film according to the invention, and the movable substrate 52 is provided with a movable reflecting film 55 which is a second reflecting film according to the invention, wherein the stationary reflecting film 54 and the movable reflecting film 55 are disposed so as to be opposed to each other via an inter-reflecting film gap G1. Further, the variable wavelength interference filter 5 is provided with an electrostatic actuator 56 used for adjusting (varying) the size of the inter-reflecting film gap G1 (the distance between the reflecting films 54, 55, the gap dimension). The electrostatic actuator 56 is constituted by a stationary electrode 561 provided to the stationary substrate 51 and a movable electrode 562 provided to the movable substrate 52. These electrodes 561, 562 are opposed to each other via an inter-electrode gap, and function as the electrostatic actuator 56 as a gap changing section according to the invention. Here, there can be adopted a configuration of disposing these electrodes 561, 562 directly on the surfaces of the stationary substrate 51 and the movable substrate 52, respectively, or a configuration of disposing these electrodes 561, 562 via other film members. It should be noted that although FIG. 5 shows an example in which the gap dimension of the inter-electrode gap is larger than the gap dimension of the inter-reflecting film gap G1, it is also possible to adopt a configuration in which the inter-electrode gap is set smaller than the inter-reflecting film gap G1.

The configuration of the variable wavelength interference filter 5 will hereinafter be described in more detail.

The stationary substrate 51 is provided with an electrode installation groove 511 and a reflecting film installation section 512 formed by etching. The stationary substrate 51 is formed to have a thickness dimension larger than that of the movable substrate 52, and no deflection of the stationary substrate 51 occurs due to the electrostatic attractive force generated when applying a voltage to the electrostatic actuator 56, or the internal stress of the stationary electrode 561.

The electrode installation groove 511 is formed to have, for example, a ring-like shape centered on the planar center point of the stationary substrate 51. The reflecting film installation section 512 is formed so as to protrude toward the movable substrate 52 from the center of the electrode installation groove 511 in the plan view described above. The bottom surface of the electrode installation groove 511 forms an electrode installation surface 511A on which the stationary electrode 561 is disposed. Further, the projection tip surface of the reflecting film installation section 512 forms a reflecting film installation surface 512A.

Further, although not shown in the drawings, the stationary substrate 51 is provided with an electrode extraction groove extending from the electrode installation groove 511 toward the outer peripheral edge of the stationary substrate 51, wherein the electrode extraction groove is provided with an extraction electrode of the stationary electrode 561 disposed in the electrode installation groove 511.

The electrode installation surface 511A of the electrode installation groove 511 is provided with the stationary electrode 561. More specifically, the stationary electrode 561 is disposed in an area of the electrode installation surface 511A, the area being opposed to the movable electrode 562 of the movable section 521 described later. Further, it is also possible to adopt a configuration in which an insulating film for ensuring an insulation property between the stationary electrode 561 and the movable electrode 562 is stacked on the stationary electrode 561. Further, a stationary extraction electrode is connected to the stationary electrode 561, wherein the stationary extraction electrode is extracted from the electrode extraction groove described above to an outer peripheral portion of the stationary substrate 51, and is connected to the filter drive circuit of the circuit board 34.

It should be noted that although in the present embodiment, there is shown the configuration of disposing the single stationary electrode 561 on the electrode installation surface 511A, it is also possible to adopt, for example, a configuration (a dual electrode configuration) having two concentric electrodes centered on the planar center point.

As described above, the reflecting film installation section 512 is formed to have a roughly columnar shape, which is coaxial with the electrode installation groove 511, and has a diameter smaller than that of the electrode installation groove 511, and the reflecting film installation section 512 is provided with the reflecting film installation surface 512A opposed to the movable substrate 52 of the reflecting film installation section 512.

The reflecting film installation section 512 is provided with the stationary reflecting film 54. As the stationary reflecting film 54, a metal film made of, for example, Ag, or an alloy film made of, for example, an Ag alloy can be used. Further, it is also possible to use a dielectric multilayer film with a high refractive index layer made of, for example, $TiO_2$, and a low refractive index layer made of, for example, $SiO_2$. Further, it is also possible to use a reflecting film obtained by stacking a metal film (or an alloy film) on a dielectric multilayer film, a reflecting film obtained by stacking a dielectric multilayer film on a metal film (or an alloy film), a reflecting film obtained by laminating a single refractive layer (made of, e.g., $TiO_2$ or $SiO_2$) and a metal film (or an alloy film) with each other, and so on.

The movable substrate 52 is provided with the movable section 521 having a circular shape centered on the planar center point, a holding section 522 coaxial with the movable section 521 and for holding the movable section 521, and a substrate peripheral section 525 disposed on the outer side of the holding section 522.

The movable section 521 is formed to have a thickness dimension larger than that of the holding section 522, and is formed in the present embodiment, for example, to have the same thickness dimension as that of the movable substrate 52. The movable section 521 is formed to have a diameter larger than at least the diameter of the outer peripheral edge of the reflecting film installation surface 512A in the filter plan view. Further, the movable section 521 is provided with a movable electrode 562 and the movable reflecting film 55.

The movable electrode 562 is opposed to the stationary electrode 561 via the inter-electrode gap, and is formed to have a ring-like shape, which is the same shape as that of the stationary electrode 561. Further, although not shown in the drawings, the movable substrate 52 is provided with a movable extraction electrode extending from the outer peripheral edge of the movable electrode 562 toward the outer peripheral edge of the movable substrate 52. Similarly to the stationary extraction electrode, the movable extraction electrode is connected to the filter drive circuit of the circuit board 34.

The movable reflecting film 55 is disposed at the central portion of a movable surface 521A of the movable section 521 so as to be opposed to the stationary reflecting film 54 via the inter-reflecting film gap G1. As the movable reflecting film 55, a reflecting film having the same configuration as that of the stationary reflecting film 54 described above is used.

The holding section 522 is a diaphragm surrounding the periphery of the movable section 521, and is formed to have a thickness dimension smaller than that of the movable section 521. Such a holding section 522 is easier to be deflected than the movable section 521, and it becomes possible to displace the movable section 521 toward the stationary substrate 51 with a weak electrostatic attractive force. On this occasion, since the movable section 521 has a larger thickness dimension and higher rigidity than those of the holding section 522, the shape variation of the movable section 521 does not occur even in the case in which the holding section 522 is pulled toward the stationary substrate 51 due to the electrostatic attractive force. Therefore, deflection of the movable reflecting film 55 provided to the movable section 521 does not occur, and it becomes possible to always keep the stationary reflecting film 54 and the movable reflecting film 55 in a parallel state.

It should be noted that although in the present embodiment the holding section 522 having a diaphragm shape is shown as an example, the shape is not limited thereto, but a configuration of, for example, providing beam-like holding sections arranged at regular angular intervals centered on the planar center point can also be adopted.

As described above, the substrate peripheral section 525 is disposed outside the holding section 522 in the filter plan view. The surface of the substrate peripheral section 525 opposed to the stationary substrate 51 is provided with the second bonding section 523 opposed to the first bonding section 513, and the second bonding section 523 is bonded to the first bonding section 513 with the bonding film 53.

As shown in FIG. 5, in the present embodiment, the substrate peripheral section 525 of the movable substrate 52 of the variable wavelength interference filter 5 is fixed to the back panel 312 via a bonding layer 526. On this occasion, the variable wavelength interference filter 5 is disposed so that the light passage hole 314 of the back panel 312 is positioned in an area Ar1 where the stationary reflecting film 54 and the movable reflecting film 55 are opposed to each other in the filter plan view.

In such a configuration, the light output from the pixel P0 of the display 11 located in front of the light passage hole 314 enters the reflecting films 54, 55 of the variable wavelength interference filter 5, while the light output from other pixels P1, P2 is blocked by the back panel 312 and an inner peripheral surface of the light passage hole 314.

Further, as shown in FIG. 5, an incident angle limiting film 524 included in the incident angle limiting unit according to the invention is disposed on the surface of the movable section 521 opposed to the back panel 312. Specifically, the incident angle limiting film 524 is an LCF, and transmits the incident light, which has an incident angle within a predetermined angle centered on the normal direction of the incident angle limiting film 524, to the inside of the variable wavelength interference filter 5, and blocks the light input from other directions.

In such a variable wavelength interference filter 5 as described above, the stationary electrode 561 and the movable electrode 562 constitute the electrostatic actuator 56, and these electrodes 561, 562 are connected to the filter drive circuit disposed in the circuit board 34. Further, the filter drive circuit applies a voltage to the electrostatic actuator 56 under the control of the control section 40 to thereby exert the electrostatic attractive force corresponding to the voltage between the electrodes 561, 562, and thus the gap dimension of the inter-reflecting film gap G1 is changed. Thus, it becomes possible to change the wavelength of the light to be transmitted through the variable wavelength interference filter 5.

Configuration of Control Section

Figure 6:
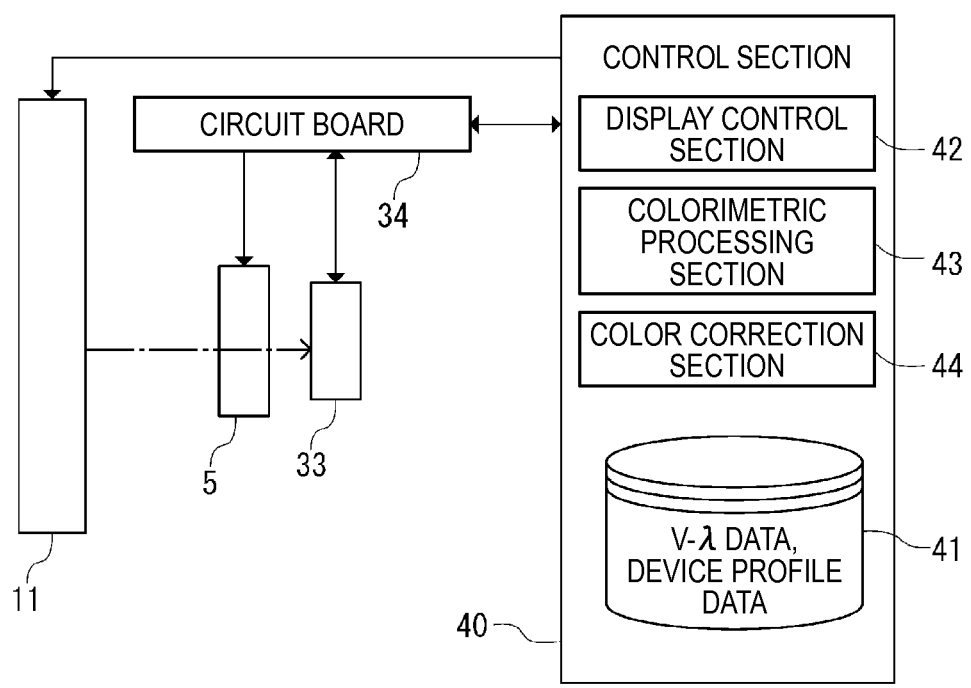
FIG. 6 is a block diagram of the image display device according to the present embodiment.

FIG. 6 is a block diagram showing a schematic configuration of the image display device 1 according to the present embodiment.

As shown in FIG. 6, the control section 40 is provided with a storage section 41, a display control section 42, a colorimetric processing section 43, and a color correction section 44.

The storage section 41 is formed of, for example, a hard disk drive and a memory. The storage section 41 stores a variety of types of data such as V-$\lambda$ data representing a relationship of the wavelength of the light to be transmitted through the variable wavelength interference filter 5 with respect to the drive voltage applied to the electrostatic actuator 56 of the variable wavelength interference filter 5.

Further, in the storage section 41, there is recorded device profile data, which is data for reproducing the color data of the original image on the display 11, and stores parameters (e.g., a voltage to be applied to the liquid crystal for setting the transmittance of each of the colors of RGB to a predetermined value in, for example, a liquid crystal panel) for controlling the display 11 with respect to each of the color data.

The display control section 42 controls the display 11 based on the device profile data stored in the storage section 41.

The colorimetric processing section 43 drives the electrostatic actuator 56 of the variable wavelength interference filter 5 based on the V-$\lambda$, data stored in the storage section 41. Further, the colorimetric processing section 43 drives the photosensor 33 to obtain the light intensity of the light having been transmitted through the variable wavelength interference filter 5.

The color correction section 44 corrects the device profile data based on the spectrum thus obtained.

Color Correction Process in Image Display Device

Figure 7:
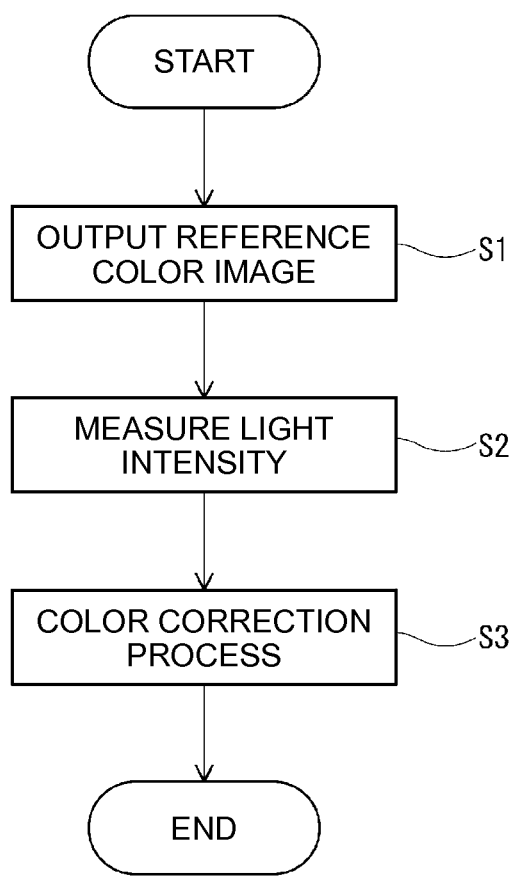
FIG. 7 is a flowchart showing an image display process in the image display device according to the present embodiment.

Then, the color correction process in such an image display device as described above will be explained with reference to the accompanying drawings. FIG. 7 is a flowchart showing the color correction process in the image display device 1.

In order to perform the color correction process of the image display device 1, firstly, the photometric section 30 is made to proceed toward the display 11 from the housing section 121 of the bezel section 12.

Subsequently, the display control section 42 makes (step S1) the display 11 display an image of a reference color (e.g., white) based on the color data stored in, for example, the device profile data. It should be noted that the display position of the image can also be limited to a pixel area opposed to the photometric section 30.

Subsequently, the colorimetric processing section 43 applies the voltage to the electrostatic actuator 56 of the variable wavelength interference filter 5 of the photometric section 30 based on the V-$\lambda$, data. Further, the colorimetric processing section 43 drives the photosensor 33 to obtain (step S2) the light intensity of the light having been transmitted through the variable wavelength interference filter 5. In the step S2, the voltage to be applied to the electrostatic actuator 56 is sequentially varied to thereby vary the wavelength of the light to be transmitted through the variable wavelength interference filter 5 at predetermined intervals (e.g., intervals of 10 nm), and the light intensity of the light with each of the wavelengths is obtained. Further, the colorimetric processing section 43 stores the wavelength and the light intensity into the storage section 41 so as to be associated with each other. In other words, the storage section 41 stores the spectrum data of the color actually output when the display 11 displays the reference color.

Subsequently, the color correction section 44 performs (step S3) the color correction process. To this end, firstly, measured color data (e.g., data such as RGB or Lab) of the color measured is calculated from the spectrum data of the reference color obtained in the step S2. Then, the color correction section 44 calculates a difference value between the original data of the reference color and the measured color data, and then corrects the device profile data based on the difference value.

It should be noted that although in the example of the color correction process described above, only the color correction based on the image of the reference color is performed, the color correction process is not limited to this example, but it is also possible to make the display 11 display single color images while sequentially switching the single color images, and perform such a color correction process as described above on each of the images.

Functions and Advantages of Present Embodiment

The image display device 1 according to the present embodiment makes the light of the reference color image displayed on the display 11 enter the variable wavelength interference filter 5 to transmit the light having the wavelength corresponding to the gap dimension between the reflecting films 54, 55, and then detects the light intensity using the photosensor 33. Then, the control section 40 performs the color correction of the display color of the display 11 based on the light intensity detection result (the spectrum of the light emitted from the display 11) of the plurality of lights with the respective wavelengths obtained by sequentially switching the gap dimension.

Figure 9:
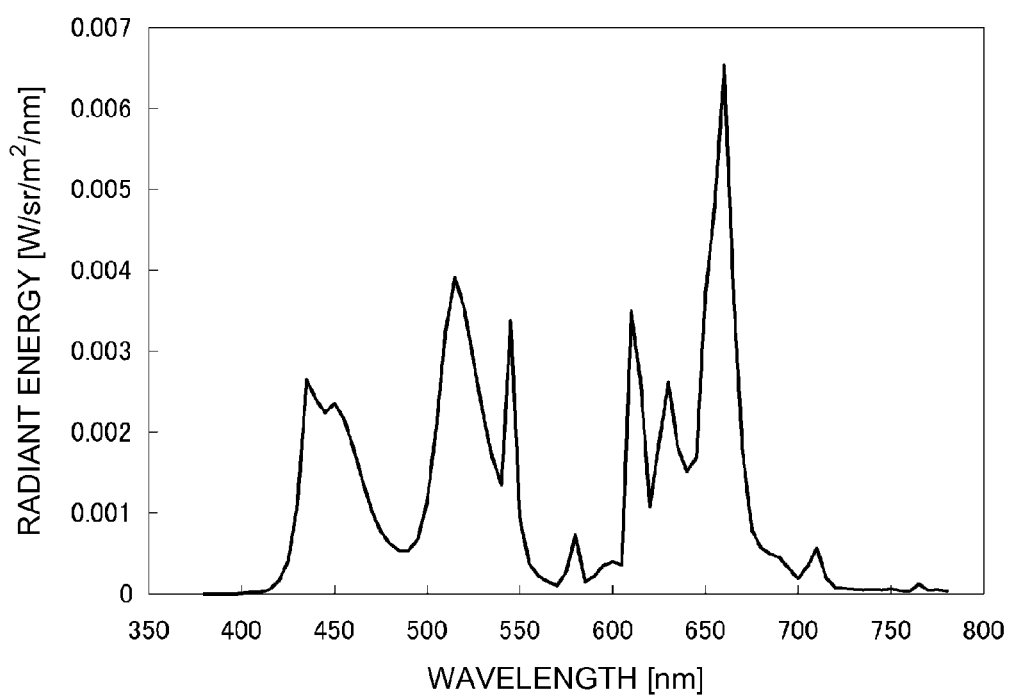
FIG. 9 is a diagram showing an example of the spectrum of light output from a liquid crystal display.

In the display device such as a liquid crystal display, since the light output from the display 11 has the light intensity corresponding to the peak wavelength varying in a peaked manner as shown in FIG. 9, it is unachievable to identify which wavelength corresponds to the light intensity in the case of, for example, detecting the display color with three bands of RGB. In contrast, in the present embodiment, since the light intensity of each of the wavelengths is obtained as described above, the light intensity corresponding to the peak wavelength can accurately be detected. Therefore, it is possible to appropriately correct the device profile data of the display 11 based on the accurate spectrum based on the light intensity thus detected, and it is possible to control the display 11 with the accurate colors corresponding to the original image data.

In the present embodiment, the variable wavelength interference filter 5 is used as the spectroscopic element according to the invention. In such a variable wavelength interference filter 5 as described above, the gap dimension between the reflecting films 54, 55 can accurately and easily be changed by varying the voltage applied to the electrostatic actuator 56. Therefore, by sequentially switching the applied voltage to the electrostatic actuator 56, it is possible to accurately and easily detect the light intensity of the light with each of the wavelengths output from the display 11. Further, the variable wavelength interference filter 5 can easily be configured by disposing the stationary substrate 51 provided with the stationary reflecting film 54 and the stationary electrode 561 and the movable substrate 52 provided with the movable reflecting film 55 and the movable electrode 562 so as to be opposed to each other. Here, the substrates 51, 52 each can be formed to have a thickness, for example, equal to or smaller than 1 mm, and it is sufficient for the gap dimension of the inter-reflecting film gap G1 to be set, for example, equal to or smaller than 1 µm in accordance with the wavelength of the light to be transmitted. Therefore, miniaturization and thickness reduction become possible, and the size of the photometric section 30 can also be miniaturized and reduced in thickness compared to the case of using a spectroscopic element such as an AOTF or an LCTF. Therefore, it becomes possible to sufficiently house the photometric section 30 in the bezel section 12 of the display section 10, and it becomes possible to install the photometric section 30 to the image display device 1 with the simple configuration.

In the present embodiment, the light passage hole 314 is provided to the back panel 312 having a light blocking property and opposed to the display 11 of the case 31, and the light having passed through the light passage hole 314 is transmitted to the variable wavelength interference filter 5. In other words, the light, which is output from the pixel P0 of the pixels of the display 11 opposed to the light passage hole 314, enters the variable wavelength interference filter 5, while the light output from the other pixels (P1 and P2) is blocked by the back panel 312 and fails to enter the light passage hole 314.

Therefore, it results that the incident angle of the incident light entering the variable wavelength interference filter 5 and the photosensor 33 is limited by the light passage hole 314. In the case of transmitting the light with a predetermined wavelength using the variable wavelength interference filter 5, if the incident light obliquely enters the reflecting films 54, 55 of the variable wavelength interference filter 5, the wavelength of the transmitted light is shifted to degrade the resolution. In contrast, since the light with the wavelength corresponding to the gap dimension can accurately be transmitted by making the incident light enter perpendicularly the reflecting films 54, 55, the accurate spectrum of the light output from the display 11 can be obtained.

In addition to the above, in the case in which the color shade when viewing the display 11 from the front and the color shade when viewing the display 11 from the side are different from each other as in the case of, for example, the liquid crystal display, the incident light obliquely enters the reflecting films 54, 55 and it is unachievable to measure the accurate spectrum unless the back panel 312 having such a light passage hole 314 as described above is disposed. In contrast, according to the present embodiment, since the incident angle is limited by the light passage hole 314, such a problem as described above can be suppressed, and the spectrum of the light recognized when observing the display 11 from the front can be measured.

Further, the incident angle limiting film 524 formed of an LCF or the like is disposed on the surface of the movable section 521, which is the surface of the variable wavelength interference filter 5, of which the incident light enters. The incident angle limiting film 524 can highly limit the transmission direction of the incident light, and such an incident angle limiting film can be disposed on, for example, a plane of incidence of light of the spectroscopic element, and can more surely suppress the transmission of the light obliquely entering the incident angle limiting film 524. Thus, it is possible to further improve the resolution of the variable wavelength interference filter 5, and the device profile data can be corrected based on the spectrum with higher accuracy.

In the present embodiment, the photometric section 30 is disposed rotatably with respect to the bezel section 12 with the rotary shaft 32, and is arranged to be able to retractably proceed from the housing section 121 of the bezel 12 toward the display 11. Therefore, when the colorimetric process is not performed (when performing the normal image display on the display 11), the photometric section 30 can be housed in the housing section 121 of the bezel section 12. Further, as described above, since the photometric section 30 using the variable wavelength interference filter 5 can easily be miniaturized and reduced in thickness, even in the case of providing the housing section 121 to the bezel section 12, the bezel section 12 never grows in size.

Other Embodiments

It should be noted that the invention is not limited to the embodiment described above, but includes modifications, improvements, and so on within a range where the advantages of the invention can be achieved.

Although in the embodiment described above, there is shown the example in which the light blocking plate having the light passage hole according to the invention is formed of the single pack panel 312, the invention is not limited to this configuration.

Figure 8:
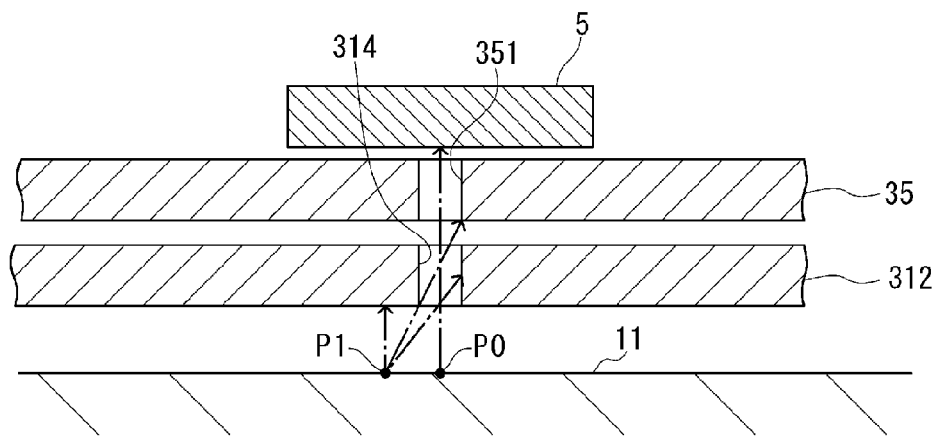
FIG. 8 is a cross-sectional view showing a configuration of a part of an image display device according to another embodiment of the invention, the part being adjacent to the variable wavelength interference filter.

It is also possible to adopt a configuration in which, for example, a light blocking plate 35 provided with a light passage hole 351 is further disposed to the back panel 312 described above as shown in FIG. 8. In this case, the light having passed through both of the light passage hole 314 of the back panel 312 and the light passage hole 351 of the light blocking plate 35 enters the variable wavelength interference filter 5.

In such a configuration as described above, the incident angle of the incident light entering the variable wavelength interference filter 5 can more surely be limited than in the case of limiting the incident angle only with the light passage hole 314 of the back panel 312.

It is also possible to adopt a configuration of disposing a drive mechanism, which automatically moves the photometric section 30 retractably from the bezel section 12 toward the display 11, to one of the bezel section 12 and the photometric section 30. In this case, for example, a gear wheel is provided to the rotary shaft 32, and the driving force of a drive motor is transmitted to the gear wheel to rotate the photometric section 30. According to this configuration, by controlling the drive motor by the control of the control section 40, the photometric section 30 can automatically be moved retractably from the bezel section 12 toward the display 11.

Although in the embodiment described above, there is described the example of fixing the movable substrate 52 of the variable wavelength interference filter 5 to the back panel 312, it is also possible to adopt a configuration of, for example, fixing the stationary substrate 51 to the back panel 312. Since the stationary substrate 51 is larger in thickness dimension than the movable substrate 52, the deflection of the stationary substrate 51 due to the bonding stress can be suppressed.

Further, although there is described the example of fixing the variable wavelength interference filter 5 to the back panel 312, the invention is not limited to this configuration. It is also possible to adopt a configuration of, for example, disposing the stationary substrate 51 on the photosensor 33. On this occasion, it is also possible to bond the stationary substrate 51 and the photosensor 33 to each other with, for example, transparent resin. Thus, since the air layer does not intervene between the photosensor 33 and the stationary substrate, the light intensity loss can be suppressed.

Further, it is also possible to fix the stationary substrate 51 to the circuit board 34 with anisotropic conductive films each made of, for example, an anisotropic conductive paste (ACP), and then connect the electrodes 561, 562 of the electrostatic actuator 56 and the filter drive circuit on the circuit board 34 to each other via the anisotropic conductive films.

Although in the embodiment described above, there is described the example of fixing the variable wavelength interference filter 5 directly to the back panel 312 (or the photosensor 33, the circuit board 34), it is also possible to adopt a configuration in which, for example, the variable wavelength interference filter 5 is housed in a sealed housing, and then the sealed housing is fixed to the back panel 312 (or the photosensor 33, the circuit board 34).

In this case, by keeping the inside of the housing in an environment of vacuum or pressure reduced from the atmospheric pressure, the responsiveness when applying the voltage to the electrostatic actuator 56 can dramatically be improved, and speeding up of the photometric process by the photometric section 30 can be achieved.

Further, by housing the variable wavelength interference filter 5 into the housing, entrance of a foreign matter or the like attached to the display 11 can be prevented, and deterioration due to the foreign matter attached to the reflecting films 54, 55 and degradation of the gap control due to the foreign matter attached to the electrodes 561, 562 can be suppressed.

Although in the embodiment described above, the configuration of providing the single photometric section 30 is described as an example, it is also possible to adopt a configuration of, for example, providing a plurality of, namely two or more, photometric sections 30. In this case, the device profile data can be corrected based on the light output from a plurality of pixels of the display 11.

Although in the present embodiment described above, the configuration of providing both of the light blocking plate according to the invention and the incident angle limiting film is described as an example, it is also possible to adopt a configuration of providing only either one of the light blocking plate provided with the light passage hole and the incident angle limiting film.

Although in the embodiment described above, the stationary image display device 1 shown in FIG. 1 is described as an example of the image display device according to the invention, the invention is not limited to this example. The invention can also be applied to a display device of, for example, a portable terminal device such as a cellular phone or a smartphone as the image display device besides the above.

Further, although in the embodiment described above, the variable wavelength interference filter 5 is described as an example of the spectroscopic element according to the invention, the invention is not limited to this example. Any configuration capable of housing the spectroscopic element in the bezel section 12 can be adopted, and a linear variable filter, for example, can also be adopted.

Further, although the configuration of disposing the stationary reflecting film 54 as the first reflecting film on the stationary substrate 51 as the first substrate and disposing the movable reflecting film 55 as the second reflecting film on the movable substrate 52 as the second substrate is described as an example of the variable wavelength interference filter 5, the invention is not limited to this configuration. For example, a configuration not provided with the first substrate or the second substrate can also be adopted. In this case, for example, after disposing the first reflecting film on one surface of a parallel glass substrate, and disposing the second reflecting film on the other surface parallel to the one surface, the parallel glass substrate is etched using an etching process. In the present configuration, the first substrate and the second substrate are eliminated, and thus, a thinner spectroscopic element can be obtained. In this case, by making, for example, a spacer intervene between the first reflecting film and the second reflecting film, the gap dimension between the reflecting films can be maintained. Further, by disposing the first electrode on the first reflecting film, disposing the second electrode on the second reflecting film, and applying the drive voltage between the first electrode and the second electrode, the gap dimension between the reflecting films can be changed.

Besides the above, a specific structure to be adopted when putting the invention into practice can arbitrarily be replaced with another structure and so on within the range in which the advantages of the invention can be achieved.

The entire disclosure of Japanese Patent Application No. 2013-000357 filed on Jan. 7, 2013 is expressly incorporated by reference herein.

What is claimed is:

1. An image display device comprising:
    a display section adapted to display an image;
    a photometric section being disposed so as to be capable of being opposed to at least one pixel of the display section,
    the photometric section having a spectroscopic element adapted to disperse light from the pixel, and a detection section adapted to detect light dispersed by the spectroscopic element; and
    a control section adapted to control the display section and the photometric section,
    the control section obtaining a spectrum of the light from the pixel based on light intensity of the light that is dispersed by the spectroscopic element and is detected by the detection section,
    the control section performing a color correction of the pixel based on the spectrum, and
    wherein the photometric section includes a case having a front panel, a back panel, and a side panel, the back panel including a light passage disposed at a position overlapping the spectroscopic element, an interference filter adjacent to the light passage, and a circuit board disposed on the front panel, the detection section being disposed between the interference filter and the circuit board.

2. The image display device according to claim 1, wherein the spectroscopic element is a variable wavelength etalon, which includes
    a first reflecting film adapted to reflect a part of the light from the pixel and transmit a part of the light from the pixel, and
    a second reflecting film disposed so as to be opposed to the first reflecting film, and adapted to reflect a part of the light from the pixel and transmit a part of the light from the pixel, and
    makes the parts of the light from the pixel, which are entering a space between the first reflecting film and the second reflecting film, interfere with each other to take out portions of light with a specific wavelength.

3. The image display device according to claim 2, wherein the spectroscopic element includes
    a first substrate provided with the first reflecting film,
    a second substrate opposed to the first substrate and provided with the second reflecting film, and
    a gap changing section adapted to change a gap dimension between the first reflecting film and the second reflecting film.

4. The image display device according to claim 1, wherein the photometric section includes an incident angle limiting unit adapted to limit an angle of the light from the pixel entering the spectroscopic element.

5. The image display device according to claim 4, wherein the incident angle limiting unit is at least one light blocking plate, which is disposed between the display section and the spectroscopic element, and has a light passage hole disposed at a position overlapping the spectroscopic element in a plan view viewed from a direction perpendicular to a display surface of the display section.

6. The image display device according to claim 5, wherein the incident angle limiting unit is a plurality of the light blocking plates.

7. The image display device according to claim 4, wherein the incident angle limiting unit includes an incident angle limiting film disposed between the spectroscopic element and the display section.

8. The image display device according to claim 1, wherein the display section includes
    a display area adapted to display the image, and
    a bezel section surrounding the display area, and
the photometric section is disposed so as to be able to retractably proceed from the bezel section to the display area.

* * * * *